US005155501A

United States Patent [19]

Fujita et al.

[11] Patent Number: 5,155,501

[45] Date of Patent: Oct. 13, 1992

[54] ELECTROPHOTOGRAPHIC APPARATUS WITH FREQUENCY AND DUTY RATIO CONTROL

[75] Inventors: Yutaka Fujita; Hideakazu Mori, both of Shizuoka, Japan

[73] Assignee: Tokyo Electric Co., Ltd., Tokyo, Japan

[21] Appl. No.: 684,055

[22] Filed: Apr. 11, 1991

[30] Foreign Application Priority Data

Apr. 18, 1990 [JP] Japan ............................ 2-100289

[51] Int. Cl.$^5$ ............................ H04N 1/21

[52] U.S. Cl. ............................ 346/108; 358/298; 355/246

[58] Field of Search ............................ 346/108, 107 R, 160; 358/296, 298, 300, 302; 355/246, 265, 274

[56] References Cited

U.S. PATENT DOCUMENTS 4,239,373 12/1980 Weikel. Jr. ............................ 355/274
4,511,240 4/1985 Suzuki et al. ............................ 355/246

*Primary Examiner*—Mark J. Reinhart
*Attorney, Agent, or Firm*—Frishauf, Holtz, Goodman & Woodward

[57] ABSTRACT

The present invention is applied to an electrophotographic apparatus, wherein a photosensitive body charged by a charger is exposed to light emitted from an exposer, for the formation of an electrostatic latent image, and wherein the electrostatic latent iamge is developed by a developer and the image developed by the developer is transferred on a paper sheet by a transfer charger. The transfer charger of the apparatus is made up of a converter transformer, a switching circuit for controlling the excitation of the converter transformer, and an error detector, arranged in association with the converter transformer, for detecting an error voltage corresponding to a transfer voltage. The apparatus is comprised of a separately (or externally) excited converter which outputs the transer voltage from the secondary winding of the converter transformer, an input section from which one of the print density levels that are predetermined stepwise is designated, and a control section for controlling the frequency and duty ratio of a transfer signal used for causing the switching circuit to perform a switching action, in accordance with the print densith level designated from the input section and the error voltage information supplied from the error detector.

8 Claims, 5 Drawing Sheets

| BASIC VOLTAGE DATA T | FREQUENCY F | DUTY RATIO D |
|---|---|---|
| A 1 | F 1 | D 1 |
| A 2 | F 2 | D 2 |

ELECTROPHOTOGRAPHIC APPARATUS WITH FREQUENCY AND DUTY RATIO CONTROL

BACKGROUND OF THE INVENTION

1. Field of the Invention

The present invention relates to an electrophotographic apparatus, such as a laser printer, wherein a photosensitive body is irradiated with a laser beam.

2. Description of the Related Art

In a laser printer (i.e., one type of electrophotographic apparatus), the surface of the photosensitive body, which is formed of a photoconductive material, is uniformly charged and is exposed to a laser beam, so as to record image information as an electrostatic latent image. The electrostatic latent image is developed with toner, and the developed image is transferred onto a recording medium, such as a sheet of paper. The image is fixed to the recording medium.

The transfer charger of the laser printer employs a transfer voltage generator which generates a high transfer voltage.

In connection with this type of printer, it is known that the amount of charge produced on the paper sheet has an effect on the print quality, i.e., the quality of an image to be transferred onto the paper sheet. This being so, the level of the transfer voltage is so determined as to provide satisfactory print quality at all times. However, the transfer voltage electrode is set in contact with the reverse side of the paper sheet, provided that an image is transferred onto the obverse side of the paper sheet. Therefore, the amount of charge produced on the paper sheet varies, dependent upon the thickness and quality of the paper sheet and/or the ambient moisture.

SUMMARY OF THE INVENTION

Accordingly, an object of the present invention is to provide an electrophotographic apparatus which permits the transfer voltage to be maintained at a desirable value even if the amount of charge produced on a paper sheet varies in accordance with the thickness and quality of the paper sheet.

The present invention is applied to an electrophotographic apparatus, wherein the photosensitive body charged by a charger is exposed to light emitted by an exposer, for the formation of an electrostatic latent image, and wherein the electrostatic latent image is developed by a developer and the image obtained by this development is transferred onto a paper sheet by a transfer charger. The transfer charger of the apparatus is made up of a converter transformer, a switching circuit for controlling the excitation of the converter transformer, and an error detector, arranged in association with the converter transformer, for detecting an error voltage corresponding to a transfer voltage. The apparatus is comprised of: a separately (or externally) excited converter which outputs the transfer voltage from the secondary winding of the converter transformer; an input section from which one of the print density levels that are predetermined stepwise is designated; and a control section for controlling the frequency and duty ratio of a transfer signal used for causing the switching circuit to perform a switching action, in accordance with the print density level designated from the input section and the error voltage information supplied from the error detector.

In the apparatus having the above structure, a print density level is designated by operating a key of the input section, and the control section determines the frequency and duty ratio of the transfer signal in accordance with the designated print density level. On the basis of the transfer signal whose frequency and duty ratio are determined in this manner, the switching circuit performs a switching operation, thus exciting the converter externally. As a result, a transfer voltage is output from the secondary winding of the converter transformer of the converter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described, with reference to the accompanying drawings. In the description below, reference will be made to the case where the present invention is applied to a laser printer.

Figure 1:
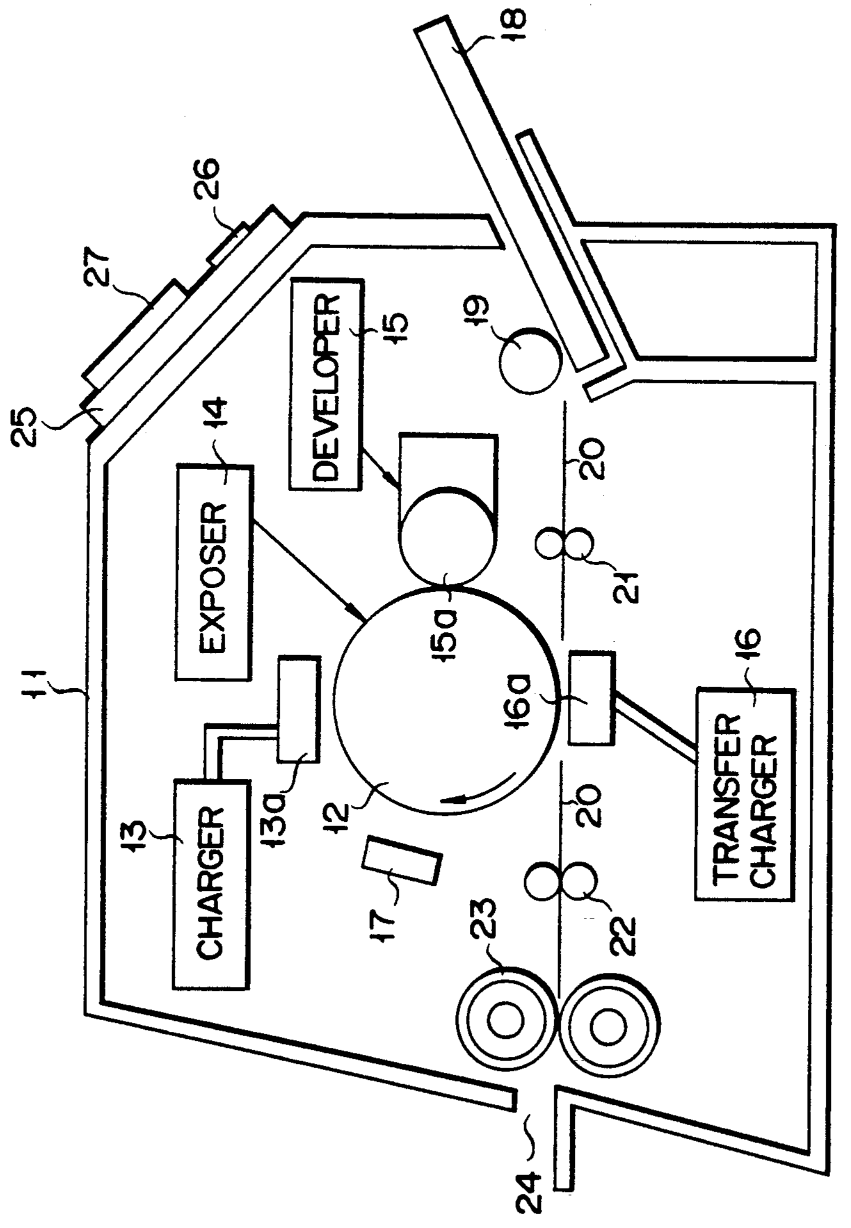
FIG. 1 is a schematic diagram showing the structure of a laser printer.

Referring to FIG. 1, a photosensitive drum 12, the surface of which is formed of a photoconductive material, is arranged substantially in the center of a casing 11. The photosensitive drum 12 can be rotated in one direction (i.e., in the direction indicated by the arrow in FIG. 1) by a main driving motor to be mentioned later. Around the photosensitive drum 12, the following structural components used in an electrophotographic process are arranged: a charger 13 for charging the photosensitive body of the photosensitive drum 12; an exposer 14 for forming an electrostatic latent image by irradiating a laser beam to the photosensitive body charged by the charger 13; a developer 15 for supplying toner to the electrostatic latent image formed on the photosensitive body, to thereby form a toner image; a transfer charger 16 for transferring the toner image from the photosensitive body to a paper sheet; and an electric discharger 17 for electrically erasing the image remaining on the photosensitive body.

The charger 13 has a charging portion 13*a*, the transfer charger 16 has a transfer charging portion 16*a*, and the developer 15 has a developing roller 15*a*.

A sheet supply cassette 18 is arranged on one side of the casing 11. From the sheet supply cassette 18, a sheet supply roller 19 takes out paper sheets 20 one by one at predetermined timings. A paper sheet 20 taken out of the sheet supply cassette 18 is conveyed to the transfer charging portion 16*a* of the transfer charger 16 by a pair of feeding rollers 21.

By the transfer charger 16, a toner image is transferred from the photosensitive drum 12 to the paper sheet 20. Then, the paper sheet 20 is conveyed by a pair of feeding rollers 22 to a fixing section 23, by which the toner image is fixed to the paper sheet 20. Thereafter, the paper sheet is guided out of the laser printer through a sheet discharge port 24 formed on the opposite side of the sheet supply cassette 18.

An operation panel 25 is arranged on an upper portion of the casing 11 such that it is located above the sheet supply cassette 18. The operation panel 25 has a key switch 26 used for designating a print density level. It also has a display device 27 which displays the designated print density level and other necessary information.

Figure 2:
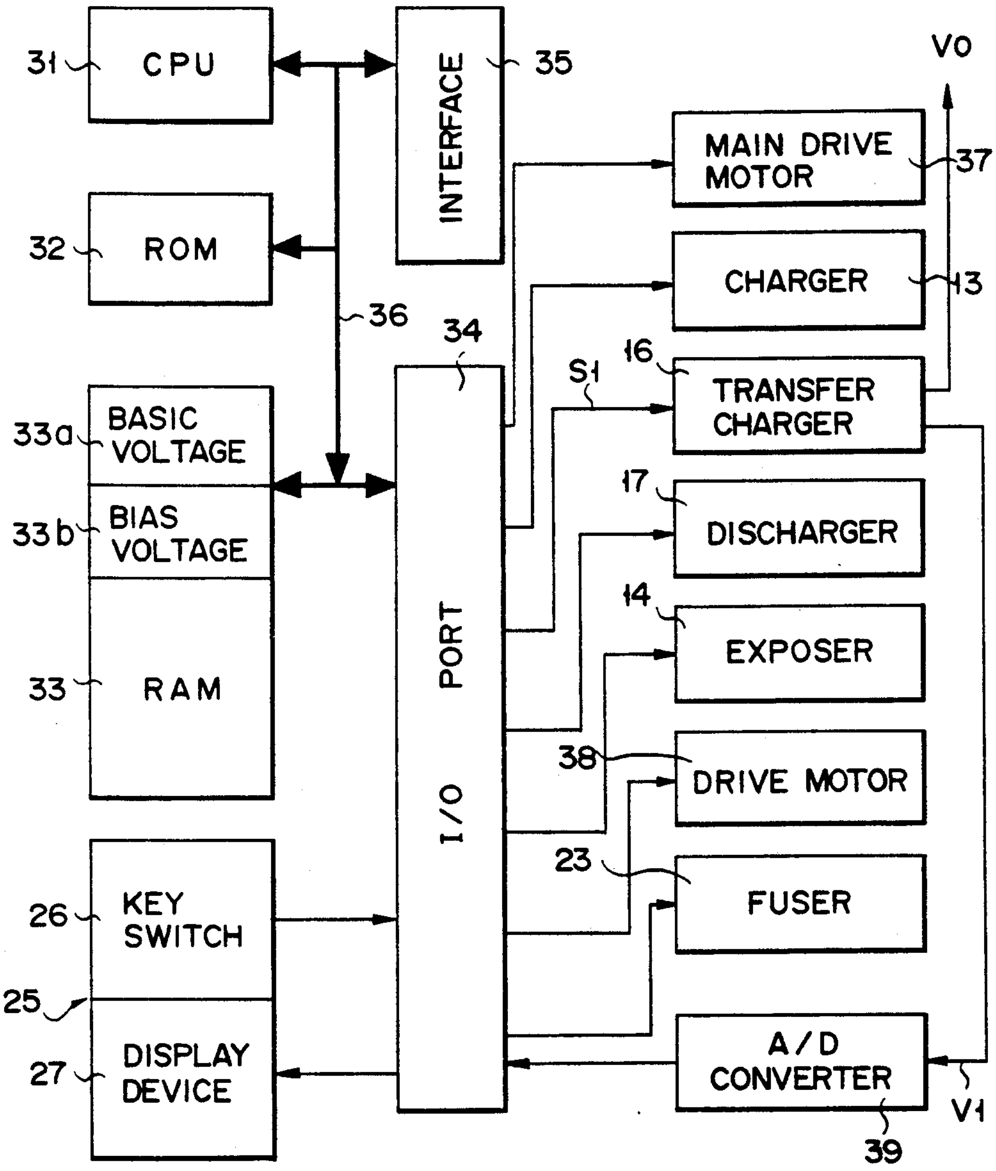
FIG. 2 is a block circuit diagram of the circuit configuration of the laser printer.

FIG. 2 is a block circuit diagram of the circuit configuration of the laser printer. Referring to FIG. 2, reference numeral 31 denotes a CPU (i.e., a central processing unit) which constitutes the major portion of the control section. Reference numeral 32 denotes a ROM (a read-only memory) for storing program data on the basis of which the CPU 31 controls each structural component incorporated in the laser printer. Reference numeral 33 denotes a RAM (a random access memory), and this RAM 33 includes: a buffer memory for storing image information and other kinds of processing data which are supplied from an external scanner or host computer; a basic voltage memory 33*a* for storing basic voltage data (i.e., a default value) which corresponds to the transfer voltage pertaining to an ordinary sheet of a standard size (e.g., an A4 or B5 size); and a bias voltage memory 33*b* for storing bias voltage data which corresponds to an increase or decrease in the printer density level designated with the key switch 26. Reference numeral 34 denotes an input/output port, and reference numeral 35 denotes an interface through which the laser printer is supplied with image information from the external host computer. Elements 31–35 noted above are connected together by a bus line 36.

A driving motor 38 is connected to the input/output port 34. This driving motor 38 drives the main driving motor 37, the charger 13, the transfer charger 16, the electric discharger 17, the exposer 14, the fixing section 23, the sheet supply roller 19, and the feeding rollers 21 and 22. An A/D converter 39 is also connected to the input/output port 34. By this A/D converter 39, an error voltage V1 which corresponds to the transfer voltage V0 output from the transfer charger 16 is converted into a digital value.

Figures 3, 6:
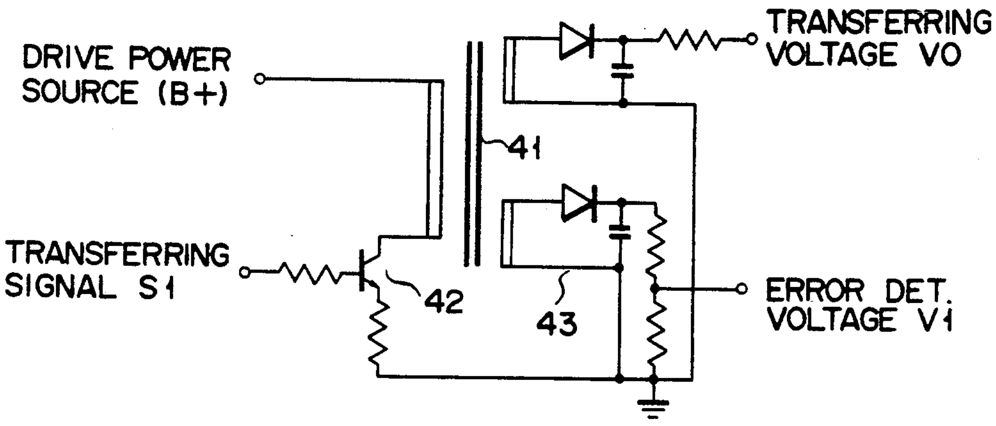
FIG. 3 is a circuit diagram of the converter incorporated in the, transfer charger of the laser printer.
FIG. 6 shows how the frequency and duty ratio of a transfer signal S1 are related to voltage data.

A separately-excited converter, such as that shown in FIG. 3, is provided in the transfer charger 16. The converter is made up of: a converter transformer 41; a switching transistor 42 for controlling the excitation of the converter transformer 41; and an error detector 43, arranged in association with the converter transformer 41, for detecting the error voltage V1 corresponding to a transfer voltage V0. From the secondary winding of the converter transformer 41, the transfer voltage V0 is output. A transfer signal S1 coming from the input/output port 34 is supplied to the base of the switching transistor 42.

Figure 4:
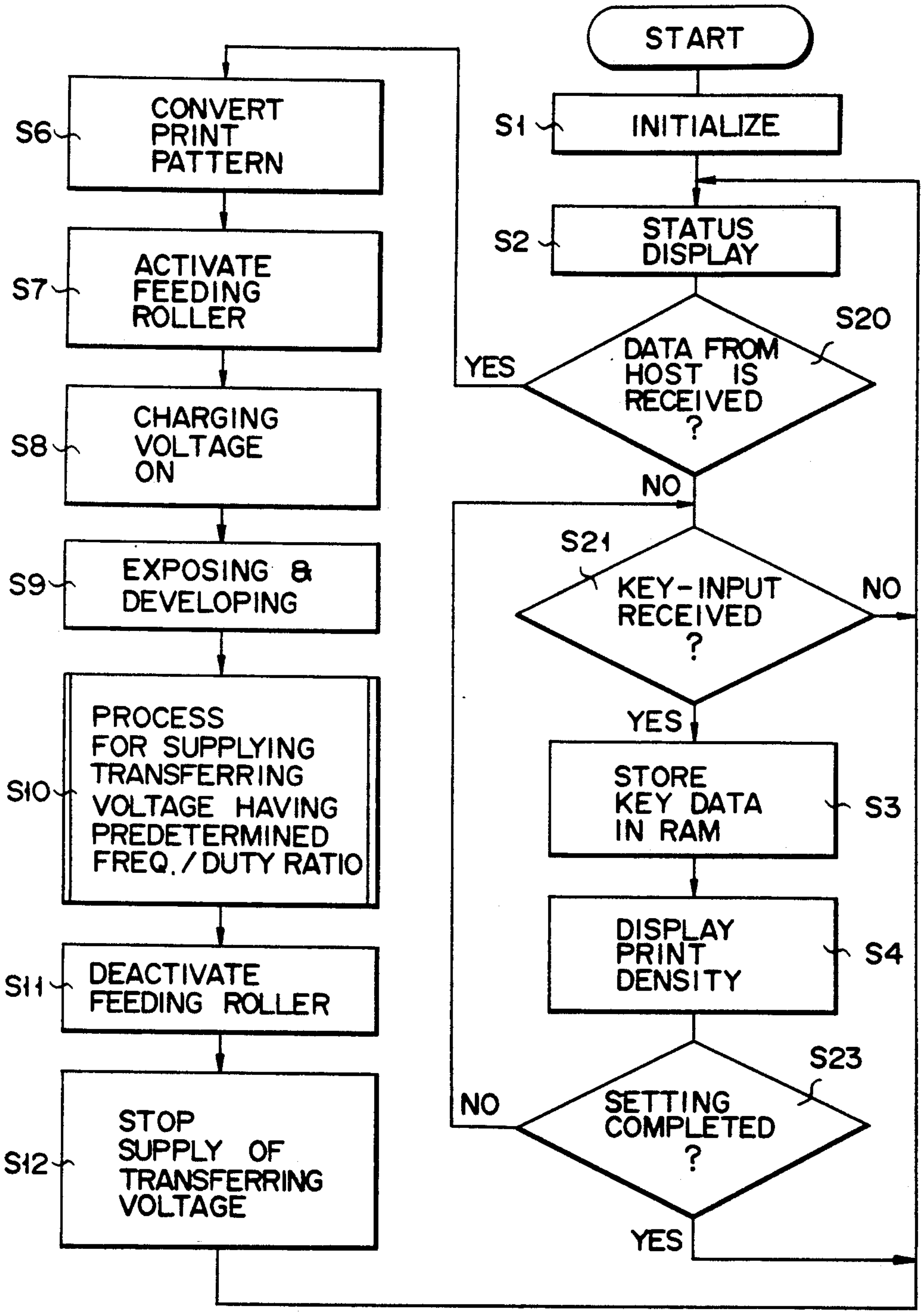
FIG. 4 is a flowchart according to which the CPU of the laser printer executes control and processing.
Figure 5:
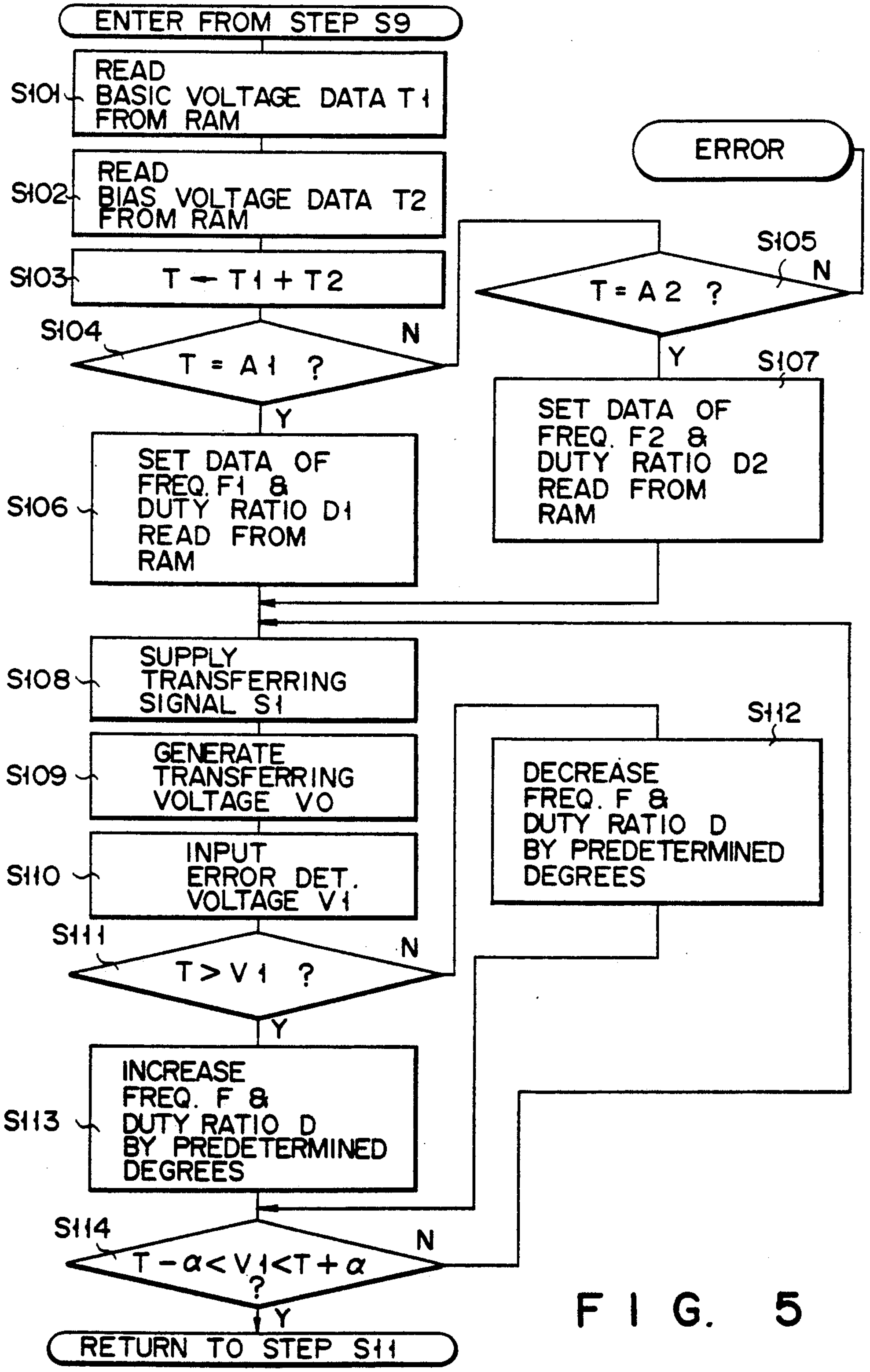
FIG. 5 is a flowchart which details a major step involved in the flowchart shown in FIG. 4.

The CPU 31 executes the control and processing shown in FIGS. 4 and 5, on the basis of the program data stored in the ROM 32.

Upon the supply of power, initialization is performed (step S1), and the status of the printer is displayed on the display device 27 (step S2). Then, the printer is brought into a standby state. More specifically, the printer waits for data to be supplied from the host computer (step S20), and further waits for a print density level to be designated from the key switch 26 (step S21).

If the printer receives data of a print density level designated by key switch 26 (step S21, YES) without receiving any data (step S20, NO), then the designated key data is stored in the bias voltage memory 33*b* of the RAM 33 as bias voltage data (step S3). This bias voltage data represents an increase or decrease in print density level. Then, the print density level is displayed on the display device 27 (step S4).

In this state, a check is made in step S23 whether or not the setting of the print density level has been completed. If the print density level has not yet been set, the flow returns to step S21, wherein the printer waits again for a print density level to be designated from the key switch 26. If, on the other hand, the print density level has been set, the flow returns to step S2, wherein the status of the printer is displayed on the display device 27.

If data (i.e., image information) supplied from the host computer is received in step S20, it is converted into a print pattern in step S6, thus preparing the bit map pattern of a print image. Subsequently, in step S7, the driving motor 38 is actuated, so as to drive the sheet supply roller 19 and the feeding rollers 21 and 22. As a result, one paper sheet 20 is taken out of the sheet supply cassette 18 and is conveyed to the transfer charger 16.

In the meantime, the charger 13 is actuated in step S8, so that the photosensitive body of the photosensitive drum 12 is charged by the charging voltage generated by the charging portion 13*a*. Subsequently, exposer 14 is activated in step S9. More specifically, an electrostatic latent image corresponding to the print pattern is formed on the photosensitive body, with the photosensitive body being irradiated with a laser beam emitted from the exposer 14. Then, the electrostatic latent image is developed with the toner supplied from the developer 15, to thereby form a toner image.

Next, in step S10, supply of a transfer voltage is controlled when that portion of the photosensitive drum 12 which bears the toner image has come to the transfer position. More specifically, basic voltage data and bias voltage data are read out of the basic voltage memory 33*a* and bias voltage memory 33*b* of the RAM 33, respectively, and a transfer voltage V0 is determined by adding the bias voltage data to the basic voltage data. Further, the digital value, which is produced by the A/D converter 39 and corresponds to the error voltage V1 output from the error detector 43, is read from the input/output port 34, and is compared with the transfer voltage V0 determined as above. On the basis of this comparison, the frequency F and the duty ratio D of a transfer signal S1 are determined, and the transfer signal S1 is supplied to the switching transistor 42 of the separately-excited converter (FIG. 3). As a result, a desirable transfer voltage V0 is generated from the separately-excited converter (Step S1O). By application of this transfer voltage V0, the toner image is transferred from the photosensitive drum 12 to a paper sheet 20.

When the predetermined time has elapsed from the above transfer operation (during the predetermined time. the paper sheet 20 is guided out of the printer through the sheet discharge port 24), the driving motor 38 is stopped in step S11, to thereby stop the feeding rollers 21 and 22. Further, the application of the transfer voltage is stopped in step S12, and the flow returns to step S2, wherein the status of the printer is displayed on the display device 27.

According to the above embodiment, the photosensitive body of the photosensitive drum 12 is uniformly charged by the charger 13, and image information is recorded on the photosensitive body as an electrostatic latent image, with the photosensitive body being irradiated with the laser beam emitted from the exposer 14. The electrostatic latent image is developed with the toner supplied from the developer 15, to thereby form a toner image, and this toner image is transferred from the photosensitive body to a paper sheet taken out of the sheet supply cassette 18. The paper sheet bearing the toner image is first conveyed to the fixing section, for image fixing, and is then guided out of the printer through the sheet discharge port 24. In the meantime, the photosensitive body is electrically discharged by the electric discharger 17, thereby making preparations for the next charging.

In the above manner, image information is printed on one paper sheet. With this printing operation repeated, image information is printed onto a plurality of paper sheets.

In the laser printer mentioned above, the transfer charger 16 employs a separately-excited converter, so as to generate a transfer voltage V0. Since a self-excitation winding, such as that required in the self-excitation type converter employed in a conventional laser printer, need not be employed in the laser printer of the present invention, the converter transformer 41 can be small in size and light in weight.

Since the converter (FIG. 3) is a separately-excited type, a transfer signal S1 to be supplied to the switching transistor 42 can be produced by the CPU 31 and picked up from the input/output port 34. Therefore, both the frequency F and duty ratio D of the transfer signal S1, which are factors for determining a transfer voltage V0, can be determined on a software basis. In other words, the transfer voltage V0 can be determined stepwise (i.e., digitally) in accordance with the key data entered with the key switch 26.

The flowchart in FIG. 5 details step S10 involved in the flowchart shown in FIG. 4, and shows how the frequency F and duty ratio D of the transfer signal S1 are determined.

After the execution of step S9 shown in FIG. 4, basic voltage data T1 is read out of the basic voltage memory 33*a* of the RAM 33 in step S101, and bias voltage data T2 is read out of the bias voltage memory 33*b* of the RAM 33 in step S102. Then, in step S103, the CPU 31 adds data T1 and data T2, to obtain their sum T.

A data table, such as that shown in FIG. 6, is stored in the RAM 33 (or in the ROM 32) shown in FIG. 2. By use of the data table, the CPU 31 checks, in steps S104 and S105, whether or not the calculated sum T corresponds to one of data A1 and data A2 listed in the data table. If the sum T does not corresponds to either of them, the CPU 31 regards this state as being an error.

If it is determined in step S104 that the sum T corresponds to data A1, frequency data F1 and duty ratio data D1 are read out of the respective areas of the RAM 33 in step S106.

If it is determined in step S104 that the sum T does not correspond to data A1, then the check in step S105 is executed. If it is determined in step S105 that the sum T corresponds to data A2, frequency data F2 and duty ratio data D2 are read out of the respective areas of the RAM 33 in step S107.

The CPU 31 determines the frequency and duty ratio of the transfer signal S1, on the basis of the readout frequency data F1 (or F2) and duty ratio data D1 (or D2), and supplies this transfer signal S1 to the transistor 42 (FIG. 3) in step S108. In response to the supply of this transfer signal S1, the converter shown in FIG. 3 generates a transfer voltage having the frequency and duty ratio determined by the CPU 31 (step S109). Simultaneous with the generation of this transfer voltage, the converter generates an error voltage V1 corresponding to the transfer voltage V0 (step S110).

In step S111, the CPU 31 compares the sum T with the error voltage V1. If the sum T is smaller than the error voltage V1, the frequency F and duty ratio D of the transfer signal S1 are decreased by predetermined degrees in step S112. If, on the other hand, the sum T is larger than the error voltage V1, the frequency F and duty ratio D of the transfer signal S1 are increased by predetermined degrees in step S113.

In step S114, the CPU 31 checks whether or not the error voltage V1 generated in accordance with the corrected frequency F and duty ratio D is within the range of $T\pm\alpha$($\alpha$: an allowable deviation range determined with reference to T). If it is determined in step S114 that the error voltage V1 is outside the range $T\pm\alpha$, then the flow returns to step S108. If it is determined in step S114 that the error voltage V1 is within the range $T\pm\alpha$, then the flow advances to step S11 shown in FIG. 4.

Let it be assumed that the user wants to interrupt a printing operation using ordinary paper sheets and perform a printing operation using thick paper sheets, such as post cards. In this case, the user is only required to adjust the bias voltage by operating the key switch 26, before starting the printing operation with reference to the thick paper sheets. Before resuming the printing operation with reference to the ordinary paper sheets, the user adjusts the bias voltage by operating the key switch 26. In comparison with the case where the bias voltage is adjusted in an analog manner in accordance with the rotation of a variable resistor, the bias adjustment based on the operation of the key switch 26 is very easy. In addition, the bias voltage determined with reference to the ordinary paper sheets can be set again easily and accurately.

When the print density level is adjusted, the density level entered by the user is displayed on the display device 27. Therefore, the user can accurately determine the print density level while simultaneously confirming the print density level displayed on the display device 27.

When describing the above embodiment, reference was made to the case where the present invention was applied to a laser printer. Needless to say, however, the present invention is not limited to this embodiment. It is applicable also to a copying machine o a printer employing a light-emitting element other than a laser.

As has been described in detail, the present invention can provide an electrophotographic printer which incorporates a separately (or externally) excited type converter and therefore allows the use of a converter transformer that is small in size and light in weight, and which provides satisfactory reproducibility at the time of adjusting a transfer voltage.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electrophotographic apparatus wherein an electrostatic latent image is formed on a charged photosensitive body, with the charged photosensitive body being irradiated with light, and a developed image obtained by developing the electrostatic latent image is transferred from the photosensitive body to a recording medium, said electrophotographic apparatus comprising:

means for generating a transfer voltage adapted to transfer the developed image onto the recording medium, and an error voltage corresponding to the transfer voltage, on the basis of a transfer signal having a predetermined frequency and a predetermined duty ratio;

means for providing density level information used for designating a print density level of an image to be transferred onto the recording medium; and means for determining the frequency and the duty ratio of the transfer signal in accordance with the error voltage and the density level information.

2. An electrophotographic apparatus according to claim 1, wherein said determining means includes:

first storage means for storing predetermined basic voltage data which determines a default value of the density level of the image to be transferred;

second storage means for storing predetermined bias voltage data which determines changes in the density level of the image to be transferred;

third storage means for storing a table showing how a value corresponding to sum data of both the basic voltage data and the bias voltage data is related with the frequency and duty ratio of the transfer signal; and means for deriving data regarding the frequency and duty ratio of the transfer signal from the table.

3. An electrophotographic apparatus according to claim 2, wherein said determining means further includes:

transfer signal-determining means for determining the frequency and duty ratio of the transfer signal, on the basis of the data regarding the frequency and duty ratio which is derived from the table in accordance with the sum data.

4. An electrophotographic apparatus according to claim 3, wherein said transfer signal-determining means includes:

means for modifying the frequency and duty ratio of the transfer signal on the basis of the data regarding the frequency and duty ratio which is derived from the table in accordance with the sum data, said modifying means operating only when the error voltage generated on the basis of the transfer signal differs from the sum data and is outside of an allowable range predetermined with respect to the sum data.

5. An electrophotographic apparatus according to claim 1, wherein said generating means includes:

a separately-excited type DC-DC converter which is driven on the basis of the transfer signal and which generates both the transfer voltage and the error voltage.

6. An electrophotographic apparatus according to claim 1, wherein said density level information-providing means includes:

input means for allowing the density level information to be entered as digital data which changes discontinuously.

7. An electrophotographic apparatus according to claim 6, wherein said electrophotographic apparatus includes a laser printer having an operation panel, and said input means is provided on the operation panel of the laser printer.

8. An electrophotographic apparatus wherein an electrostatic latent image is formed on a photosensitive body charged by a charger, with the photosensitive body being irradiated with a light beam emitted from an exposer, the electrostatic latent image is developed by a developer to obtain a developed image, and the developed image is transferred by a transfer charger from the photosensitive body onto a recording medium, said electrophotographic apparatus comprising:

a separately-excited type converter provided for the transfer charger and including: a converter transformer; switching means for controlling the excitation of the converter transformer; and an error-detecting circuit, arranged in association with the converter transformer, for detecting an error voltage corresponding to a transfer voltage, said converter outputting the transfer voltage from a secondary winding of the converter transformer;

input means for allowing one of print density levels, which are predetermined stepwise, to be designated by operation of a key; and control means for determining a frequency and a duty ratio with respect to a transfer signal used for causing the switching means to perform a switching action, in accordance with a print density level designated from the input means and error voltage information supplied from the error-detecting circuit, and for outputting the transfer signal having the frequency and the duty ratio.

* * * * *

UNITED STATES PATENT AND TRADEMARK OFFICE
CERTIFICATE OF CORRECTION

PATENT NO. : 5,155,501
DATED : October 13, 1992
INVENTOR(S) : FUJITA et al It is certified that error appears in the above-identified patent and that said Letters Patent is hereby corrected as shown below:

Title page, Section [75] Inventors:

The name of the second inventor should read:

--Hidekazu Mori--.

Signed and Sealed this

Sixteenth Day of November, 1993

Attest:

BRUCE LEHMAN

Attesting Officer

*Commissioner of Patents and Trademarks*